United States Patent [19]
Bouthillier et al.

[11] Patent Number: 5,894,552
[45] Date of Patent: Apr. 13, 1999

[54] METHOD AND APPARATUS FOR MANUALLY SWITCHING TO A SECURED NETWORK

[75] Inventors: Stephen W. Bouthillier; Ross E. Seybold; Sydney R. Blowers, all of Ridgecrest, Calif.; Robert V. Sulkowski, Jr., Houston; Randall P. Morse, Grove City, both of Pa.

[73] Assignee: The United States of America as represented by the Secretary of the Navy, Washington, D.C.

[21] Appl. No.: 08/919,180

[22] Filed: Aug. 15, 1997

[51] Int. Cl.⁶ .............................. G06F 11/00; H01J 13/00
[52] U.S. Cl. ........................... 395/187.01; 395/200.55
[58] Field of Search ..................... 395/187.01, 200.55, 395/200.59, 200.53

[56] References Cited

U.S. PATENT DOCUMENTS

| | | | |
|---|---|---|---|
| 5,619,657 | 4/1997 | Sudama et al. | 395/200.06 |
| 5,671,354 | 9/1997 | Ito et al. | 395/187.01 |
| 5,699,518 | 12/1997 | Held et al. | 395/200.11 |
| 5,740,371 | 4/1998 | Wallis | 395/200.59 |
| 5,774,650 | 6/1998 | Chapman et al. | 395/182 |
| 5,826,014 | 10/1998 | Coley et al. | 395/187.01 |
| 5,828,832 | 10/1998 | Holden et al. | 395/187.01 |

*Primary Examiner*—Robert W. Beausoliel, Jr.
*Assistant Examiner*—Norman Michael Wright
*Attorney, Agent, or Firm*—Melvin J. Sliwka; Gregory M. Bokar; David S. Kalmbaugh

[57] ABSTRACT

A secured network system comprising a readykey controller connected to a first card reader and a power relay switch. The user inserts a microchip embedded card into the first card reader which transmits a first electrical authorization signal to the readykey controller indicating that the user is authorized to use a computer for receiving and processing classified data. The readykey controller then supplies a first enable signal to a power relay switch activating the power relay switch which couples the computer's power supply to an external power source. The secured network system also allows the user to receive and process classified data, by setting a manual A/B switch to a predetermined position which allows a secured network server to be connected to the computer. The user next inserts his proximity card into a second card reader which then transmits a second electrical authorization signal to the readykey controller indicating that the user is authorized to receive and process classified data. The readykey controller next sends a second enable signal to a data relay switch. The second enable signal enables the data relay switch connecting the secured network switch to the computer which allows for the transmission of classified data between the secured network server and the computer.

12 Claims, 4 Drawing Sheets

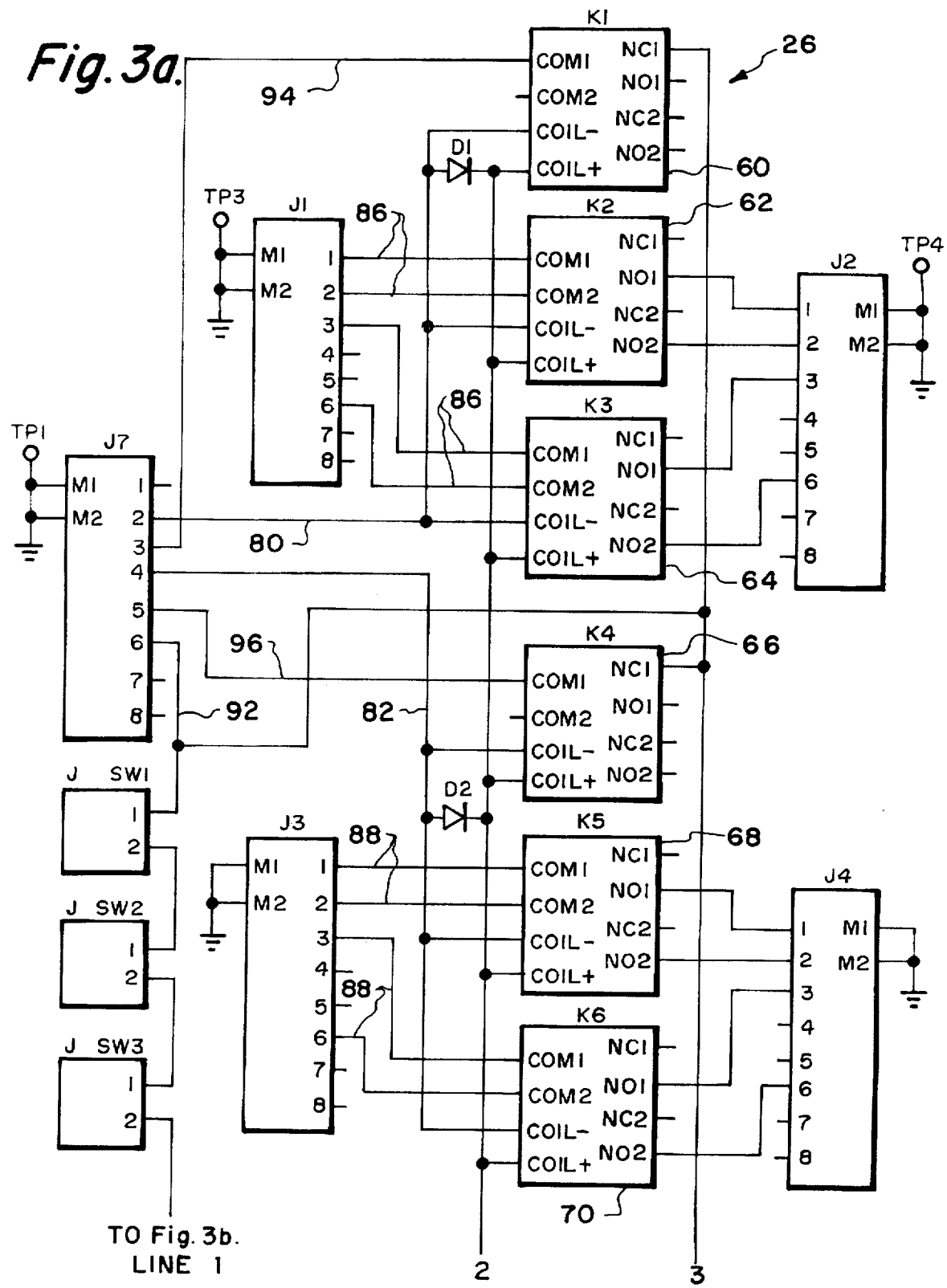

5,894,552

1

METHOD AND APPARATUS FOR MANUALLY SWITCHING TO A SECURED NETWORK

BACKGROUND OF THE INVENTION

1. Field of the Invention

The present invention relates generally to secured network systems. More particularly, the present invention relates to a secured network system which allows only a user with proper authorization to access classified data provided by a secured network server and unclassified data provided by an unsecured network server from the user's personal computer.

2. Description of the Prior Art

In the past computer security for the military services and the intelligence agencies has been provided by a variety of commercially available computer programs which are adapted for use with a variety of microcomputers such as DOS based operating system personal computers and Apple Macintosh personal computers. These computer programs are adapted to provide access control to a computer's data or the data base of a Local Area Network that is coupled to the computer.

Computer security programs often reside in the memory of the computer's central processing unit. Placing computer security programs in the computer's memory slows the computer's processing time because the computer must perform repetitive identification and auditing tasks stored in the computer's memory. In addition, conflicts between security software and the computer operating system or other computer software used by the computer may result in the computer crashing which renders the computer unusable.

Recently microchip embedded cards or "Smart Cards" have been used with computer security software to insure that classified data is not accessible to an individual who is not authorized to access the classified data. However, "Smart Cards" also rely on performing authentication and auditing functions which are stored in the computer's memory.

Accordingly, there is a need for a secure network system which will allow only authorized individuals to access classified data, but will not require the use of computer memory to perform authentication and auditing functions associated with the accessing of classified data.

SUMMARY OF THE INVENTION

The present invention overcomes some of the disadvantages of the prior art including those mentioned above in that it comprises a relatively simple yet highly effective secured network system which will allow only an authorized user of the secured network system to access classified data. The secured network system includes a readykey controller which has connected thereto a first card reader and a power relay switch. The user of the secured network system inserts a microchip embedded card into the first card reader. The first card reader then transmits a first electrical authorization signal to the readykey controller indicating that the user is authorized to use a personal computer and its associated monitor for receiving and processing classified data. The readykey controller, in response to the first electrical authorization signal, supplies a first enable signal to a power relay switch activating the power relay switch which couples the computer's power supply to an external power source.

The secured network system also allows the user to receive and process classified data, by setting a manual A/B secured network switch to a predetermined position which allows a secured network server to be connected to the personal computer. The user next inserts his proximity card into a second card reader which then transmits a second electrical authorization signal to the readykey controller indicating that the user is authorized to receive and process classified data from the secured network server. The readykey controller, responsive to the second authorization signal, sends a second enable signal to a data relay switch. The second enable signal enables the data relay switch connecting the secured network switch to the secured network server via the data relay switch which allows for the transmission of classified data between the secured network server and the personal computer.

BRIEF DESCRIPTION OF THE DRAWINGS

FIGS. 3a and 3b are electrical schematic diagrams of the data relay switch of FIG. 1.

DETAILED DESCRIPTION OF THE PREFERRED EMBODIMENT

Figure 1:
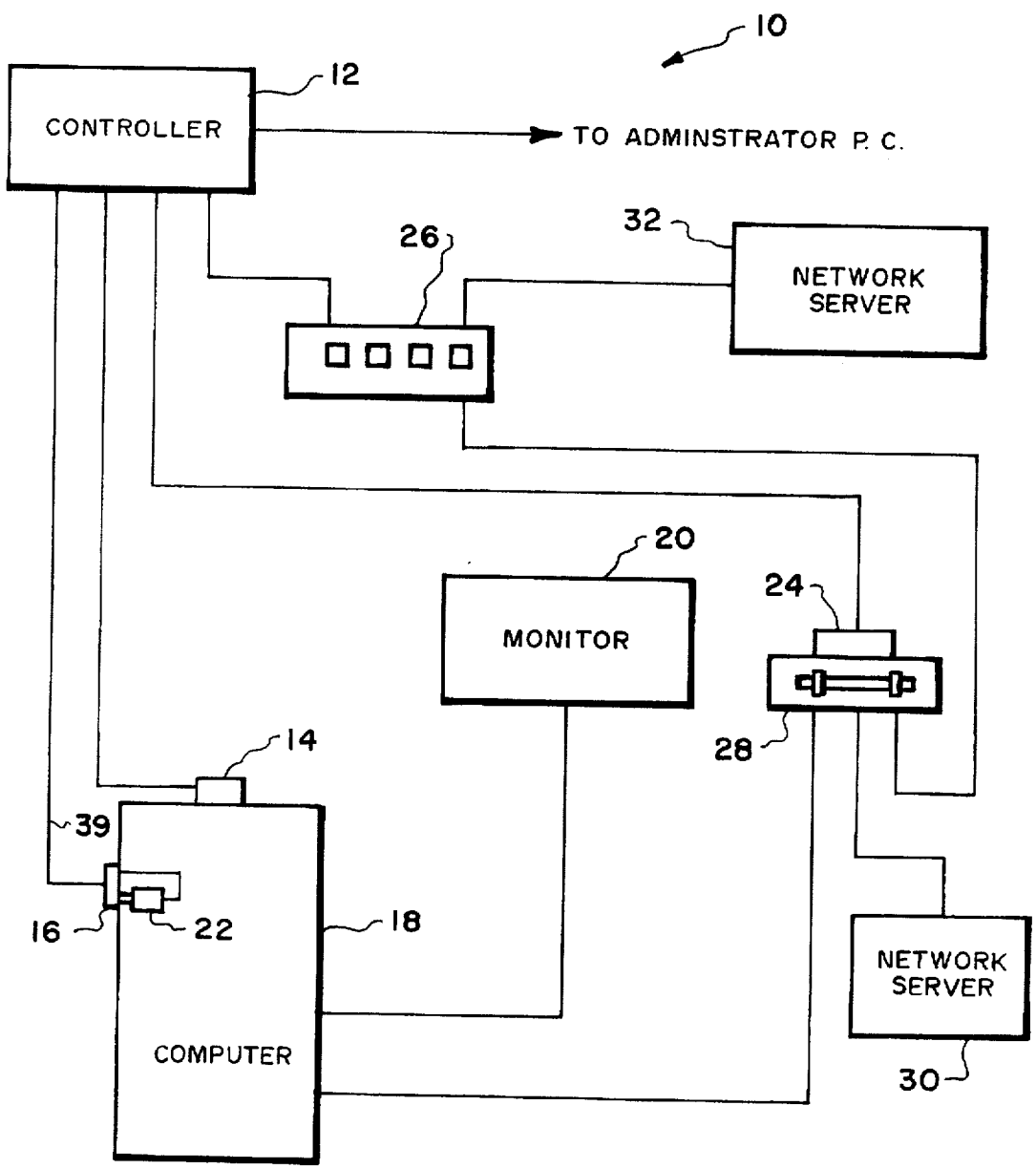
FIG. 1 is an electrical schematic diagram of a secured network system which includes power relay switch and a data relay switch.

Referring to FIG. 1 there is shown a secured network system 10 which receives and processes classified data as well as unclassified data. Secured network system 10 includes a readykey controller 12 which has connected thereto a central processing unit card reader 14 and a power relay switch 16. The user of secured network system 10 presents, that is inserts a proximity card which is a microchip embedded card into card reader 14. Card reader 14 upon receiving the microchip embedded card and verifying the card transmits an electrical authorization signal to readykey controller 12 indicating that the user is authorized to use a computer 18 and its associated monitor 20 for receiving and processing classified data.

The readykey controller 12 is also connected to an administrative personal computer (not illustrated) which monitors controller 12 to keep track of individuals accessing computer 18 and to insure an attempt at unauthorized access of data stored in computer 18 or available to computer 18 through a Local Area Network is not made.

Figure 2:
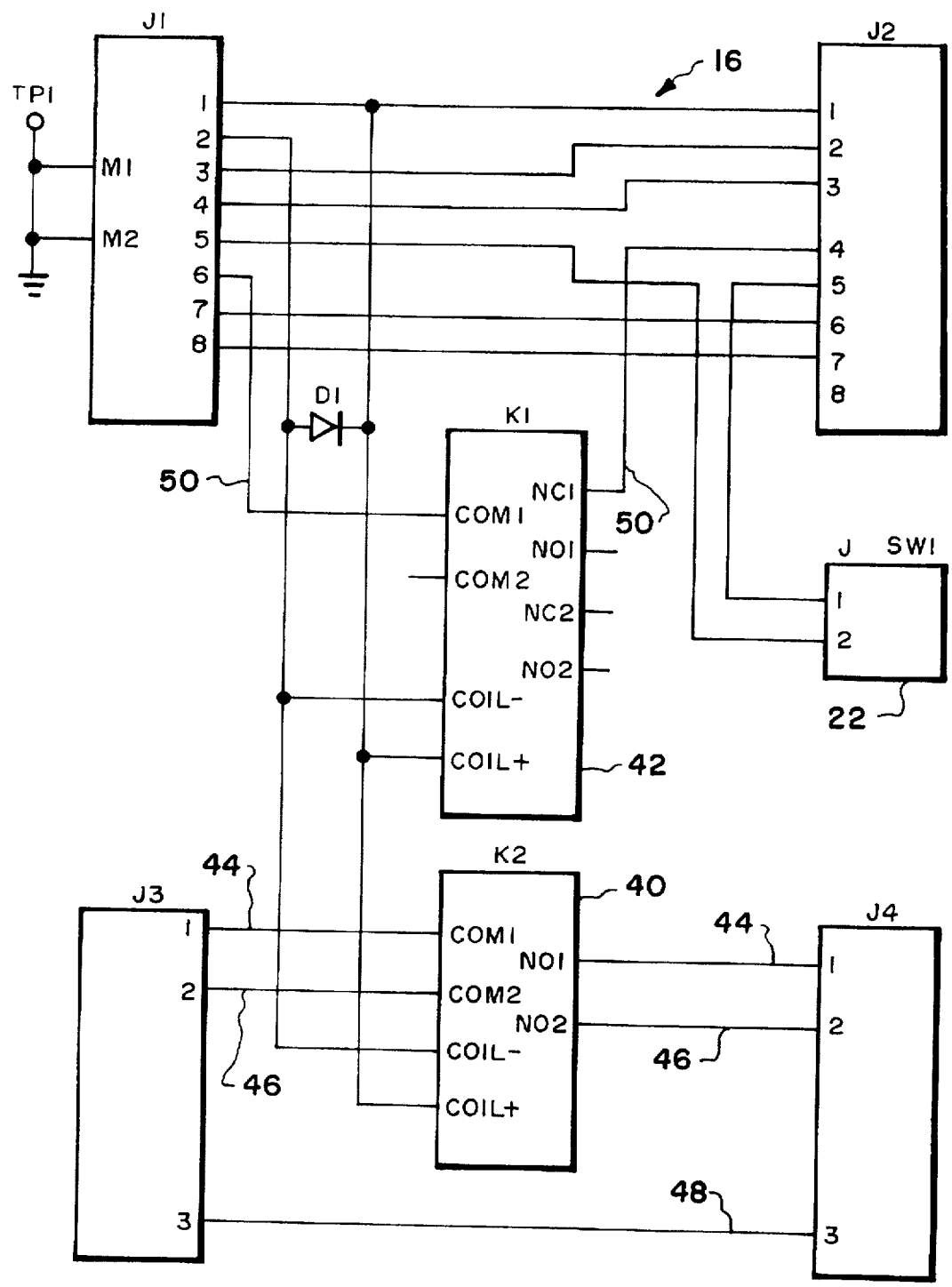
FIG. 2 is an electrical schematic diagram of the power relay switch of FIG. 1.

Referring now to FIGS. 1 and 2, readykey controller 12, in response to the electrical authorization signal from card reader 14, supplies an enable signal via terminal J1, Pin 1 and a relay power line 39 to the positive input of the coil of a relay 40 and a relay 42. The enable signal energizes the coil of relay 40 closing normally open contacts 1 and 2 of relay 40. The enable signal also energizes the coil of relay 42 opening normally closed contact 1 of relay 42.

Closing normally open contacts 1 and 2 of relay 40 connects power line 44, and neutral line 46 from terminal J3 of power relay switch 16 through relay 40 to terminal J4 of switch 16. Terminal J4 of power relay switch 16 is connected to the power supply for computer 18 so that closure of normally open contacts 1 and 2 of relay 40 provides 120 VAC to the power supply of computer 18, thereby activating computer 18 which allows the user of computer 18 to receive and process data. Line 48 between terminals J3 and J4 provides a ground for computer 18.

Line 50 which connects pin 6, terminal J1 of switch 16 to pin 4, terminal J2 of switch 16 via normally closed contact 1 of relay 42 is a status or test line. When normally closed contact 1 of relay 42 is closed a test signal is supplied to readykey controller 12 indicating that power relay switch 16 is off and computer 18 is not operational. Opening normally closed contact 1 of relay 42 results in a test signal being provided to readykey controller 12 which indicates that power relay switch 16 is on and computer 18 is operational.

Power relay switch 16 includes a tamper switch 22 which has its normally open terminals 1 and 2 connected through terminal J1 and terminal J2 of power relay switch 16 to readykey controller 12. Unauthorized removal of the power relay switch 16 from computer 18 activates tamper switch 22 sending an electrical signal to readykey controller 12 which indicates that an individual has attempted to power relay switch 16 of computer 18.

Referring again to FIG. 1, secured network system 10 includes a manual A/B switch 28 which allows the user of computer 18 to receive unclassified data from a unsecured network server 30 and classified data from a secured network server 32. The manual A/B switch 28 used in secured network system 10 is fully disclosed in U.S. patent application Ser. No. 08/687,102, "Shielded Computer Network Switch", filed Jul. 22, 1996, by Stephen W. Bouthillier.

When switch 28 is set at a first position such that unsecured network server 30 is connected to computer 18, the user of computer 18 may receive and process unclassified data from unsecured network server 30.

When the user of secured network system 10 needs to receive and process classified data, manual A/B switch 28 is set at a second position allowing secured network server 32 to be connected to computer 18. The user next inserts his proximity card into a network card reader 24 which then transmits an electrical authorization signal to readykey controller 12 indicating that the user is authorized to receive and process classified data from secured network server 32. Readykey controller 12, responsive to the authorization signal from network card reader 24 sends an enable signal to a data relay switch 26. This enable signal enables data relay switch 26 connecting secured network server 32 to computer 18 through data relay switch 26 and manual A/B switch 28.

Figure 3B:
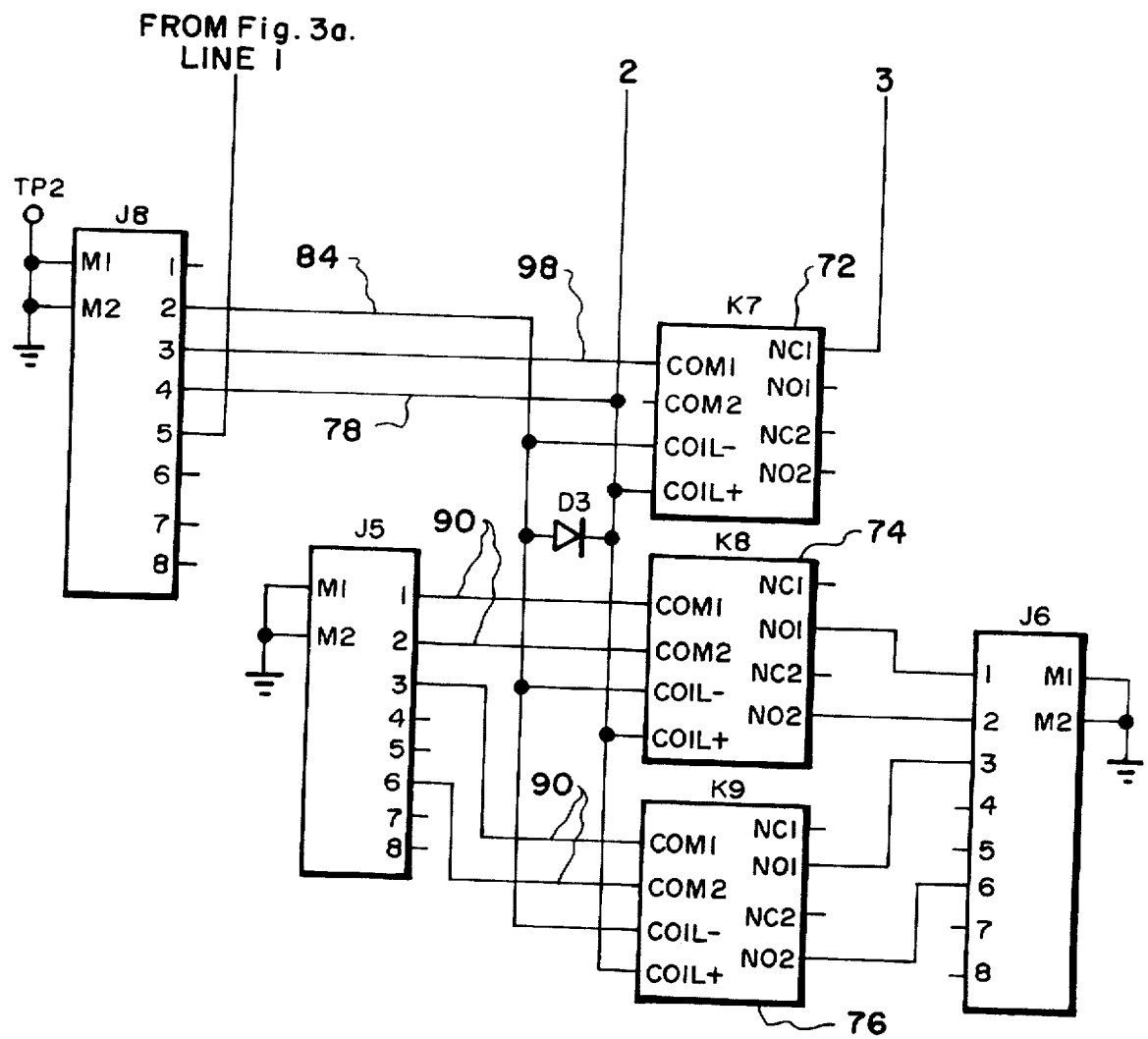

Referring to FIGS. 1, 3a and 3b, there is shown in FIGS. 3a and 3b a detailed electrical schematic diagram of data relay switch 26. Data relay switch 26 includes three sets of three relays 60, 62 and 64; 66, 68 and 70; 72, 74 and 76 which allow three computers to be connected to secured network server 32.

Secured network server 32 is connected to computer 18 through relays 60, 62 and 64 of data relay switch 26. Readykey controller 12 supplies an enable signal via terminal J7, Pin 2 of switch 26 and enable line 80 to the negative input of the coils of relays 60, 62 and 64. The enable signal energizes the coil of each relay 62 and 64 which closes the normally open contacts 1 and 2 of each relay 62 and 64. Closing the normally open contacts 1 and 2 of each relay 62 and 64 completes a data path for the four data lines 86 between secured network server 32 and computer 18 allowing for the transfer of classified data between secured network server 32 and computer 18.

Data relay switch 26 also has a status or test line 94 which indicates the status of the data path or the four data lines 86 between secured network server 32 and computer 18. When the coil of relay 60 is de-energized, normally closed contact 1 of relay 60 is closed sending a test signal to readykey controller 12 via status line 94 which indicates that the data path between secured network server 32 and computer 18 is inactive. Energizing the coil of relay 60 opens normally closed contact 1 of relay 60 which indicates that the data path between secured network server 32 and computer 18 is active.

The second set of relays 66, 68 and 70 allows for the transfer of classified data between secured network server 32 and a second computer (not illustrated) whenever a second enable signal is supplied by readykey controller 12 to the coils of relays 66, 68 and 70 via enable line 82. Energizing the coil of each relay 66 and 68 completes a data path for the four data lines 88 between secured network server 32 and the second computer allowing for the transfer of classified data between secured network server 32 and the second computer.

Data relay switch 26 has a status or test line 96 which indicates the status of the data path or the four data lines 88 between secured network server 32 and the second computer. When the coil of relay 66 is de-energized, normally closed contact 1 of relay 66 is closed sending a second test signal to readykey controller 12 via status line 96 which indicates that the data path between secured network server 32 and the second computer is inactive. Energizing the coil of relay 66 opens normally closed contact 1 of relay 66 which indicates that the data path between secured network server 32 and the second computer is active.

In a like manner, the third set of relays 72, 74 and 76 allows for the transfer of classified data between secured network server 32 and a third computer (not illustrated) whenever a third enable signal is supplied by readykey controller 12 to the coils of relays 72, 74 and 76 via enable line 84. Energizing the coil of each relay 72 and 74 completes a data path for the four data lines 90 between secured network server 32 and the third computer allowing for the transfer of classified data between secured network server 32 and the third computer.

Data relay switch 26 has a status or test line 98 which indicates the status of the data path or the four data lines 90 between secured network server 32 and the third computer. When the coil of relay 72 is de-energized, normally closed contact 1 of relay 72 is closed sending a third test signal to readykey controller 12 via status line 98 which indicates that the data path between secured network server 32 and the third computer is inactive. Energizing the coil of relay 72 opens normally closed contact 1 of relay 72 which indicates that the data path between secured network server 32 and the third computer is active.

The readykey controller 12 used in secured network system 10 is a Readykey K2100 Controller commercially available from Radionics of Solinas, Calif. Central processing unit card reader 14 and network card reader 24 are Readykey K2001 Touchfree proximity readers also commercially available from Radionics of Solinas, Calif. Manual A/B switch 28 is a Secure Switch Ethernet/Ethernet, Model SW456A commercially available from Black Box Corporation of Pittsburgh, Pa.

From the foregoing, it may readily be seen that the present invention comprises a new, unique and exceedingly useful secured network system for receiving and processing classified and unclassified data which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. A secured network system comprising:

data processing means for receiving and processing classified data and unclassified data;

a manual A/B switch connected to said data processing means;

an unclassified network server connected to said manual A/B switch, said unclassified network server providing said unclassified data to said manual A/B switch;

said manual A/B switch connecting said unclassified network server to said data processing means whenever said manual A/B switch is set to a first position which allows said unclassified data to pass through said manual A/B switch to said data processing means;

authorization signal generating means located in proximity to said manual A/B switch, said authorization signal generating means being adapted to receive a microchip embedded card authorizing a user to process said classified data with said data processing means, said authorization signal generating means providing an authorization signal whenever said microchip embedded card is presented to said authorization signal generating means and received by said authorization signal generating means;

controller means connected to said authorization signal generating means to receive said authorization signal, said controller means, responsive to said authorization signal, generating an enable signal;

a data relay switch connected to said controller means to receive said enable signal, said data relay switch being connected to said manual A/B switch;

a classified network server connected to said data relay switch, said classified network server providing said classified data to said data relay switch;

said data relay switch, responsive to said enable signal, connecting said classified network server to said manual A/B switch which allows said classified to pass through said data relay switch to said manual A/B switch;

said manual A/B switch connecting said classified network server to said data processing means through said data relay switch whenever said manual A/B switch is set to a second position which allows said classified data to pass through said manual A/B switch to said data processing means.

2. The secured network system of claim 1 wherein said data processing means comprises a computer.

3. The secured network system of claim 1 wherein said authorization signal generating means comprises a network card reader.

4. The secured network system of claim 1 wherein said controller means comprises a readykey controller.

5. The secured network system of claim 1 wherein said data relay switch comprises:

a first relay having a coil and a pair of normally open contacts, the coil of said first relay being connected to said controller means to receive said enable signal, the pair of normally open contacts of said first relay being connected to said classified network switch and said manual A/B switch;

a second relay having a coil and a pair of normally open contacts, the coil of said second relay being connected to said controller means to receive said enable signal, the pair of normally open contacts of said second relay being connected to said classified network switch and said manual A/B switch;

said enable signal energizing the coils of said first relay and said second relay closing the pair of normally open contacts of said first relay and said second relay providing a classified data path between said classified network switch and said manual A/B switch.

6. The secured network system of claim 5 wherein said data relay switch has a third relay, said relay having a coil connected to said controller means and a normally closed contact connected to said controller means, the normally closed contact of said third relay providing a status signal to said controller means whenever the coil of said third relay is de-energized, said status signal indicating that said classified data path is inactive.

7. The secured network system of claim 1 further comprising a monitor connected to data processing means.

8. A secured network system comprising:

data processing means for receiving and processing classified data and unclassified data;

a manual A/B switch connected to said data processing means;

an unclassified network server connected to said manual A/B switch, said unclassified network server providing said unclassified data to said manual A/B switch;

said manual A/B switch connecting said unclassified network server to said data processing means whenever said manual A/B switch is set to a first position which allows said unclassified data to pass through said manual A/B switch to said data processing means;

a network card reader located in proximity to said manual A/B switch, said network card reader being adapted to receive a microchip embedded card authorizing a user to process said classified data with said data processing means, said network card reader providing an authorization signal whenever said microchip embedded card is presented to said network card reader and received by said network card reader;

a readykey controller connected to said network card reader to receive said authorization signal, said readykey controller, responsive to said authorization signal, generating an enable signal;

a data relay switch connected to said readykey controller and said manual A/B switch;

a classified network server connected to said data relay switch, said classified network server providing said classified data to said data relay switch;

said data relay switch including:

a first relay having a coil and a pair of normally open contacts, the coil of said first relay being connected to said readykey controller to receive said enable signal, the pair of normally open contacts of said first relay being connected to said classified network switch and said manual A/B switch;

a second relay having a coil and a pair of normally open contacts, the coil of said second relay being connected to said readykey controller to receive said enable signal, the pair of normally open contacts of said second relay being connected to said classified network switch and said manual A/B switch;

said enable signal energizing the coils of said first relay and said second relay closing the pair of normally open contacts of said first relay and said second relay providing a classified data path between said classified network switch and said manual A/B switch allowing said classified to pass through said data relay switch to said manual A/B switch;

said manual A/B switch connecting said classified network server to said data processing means through said data relay switch whenever said manual A/B switch is set to a second position which allows said classified data to pass through said manual A/B switch to said data processing means.

9. The secured network system of claim 8 wherein said data processing means comprises a computer.

10. The secured network system of claim 8 further comprising a monitor connected to said data processing means.

11. A secured network system comprising:
 a computer for receiving and processing classified data and unclassified data;
 a manual A/B switch connected to said computer;
 an unclassified network server connected to said manual A/B switch, said unclassified network server providing said unclassified data to said manual A/B switch;
 said manual A/B switch connecting said unclassified network server to said computer whenever said manual A/B switch is set to a first position which allows said unclassified data to pass through said manual A/B switch to said computer;
 a network card reader located in proximity to said manual A/B switch, said network card reader being adapted to receive a microchip embedded card authorizing a user to process said classified data with said computer, said network card reader providing an authorization signal whenever said microchip embedded card is presented to said network card reader and received by said network card reader;
 a readykey controller connected to said network card reader to receive said authorization signal, said readykey controller, responsive to said authorization signal, generating an enable signal;
 a data relay switch connected to said readykey controller and said manual A/B switch;
 a classified network server connected to said data relay switch, said classified network server providing said classified data to said data relay switch;
 said data relay switch including:
 a first relay having a coil and a pair of normally open contacts, the coil of said first relay being connected to said readykey controller to receive said enable signal, the pair of normally open contacts of said first relay being connected to said classified network switch and said manual A/B switch;
 a second relay having a coil and a pair of normally open contacts, the coil of said second relay being connected to said readykey controller to receive said enable signal, the pair of normally open contacts of said second relay being connected to said classified network switch and said manual A/B switch;
 said enable signal energizing the coils of said first relay and said second relay closing the pair of normally open contacts of said first relay and said second relay providing a classified data path between said classified network switch and said manual A/B switch allowing said classified to pass through said data relay switch to said manual A/B switch;
 a third relay having a coil connected to said readykey controller and a normally closed contact connected to said readykey controller, the normally closed contact of said third relay providing a status signal to said readykey controller whenever the coil of said third relay is de-energized, said status signal indicating that said classified data path is inactive;
 said manual A/B switch connecting said classified network server to said computer through said data relay switch whenever said manual A/B switch is set to a second position which allows said classified data to pass through said manual A/B switch to said computer.

12. The secured network system of claim 11 further comprising a monitor connected to said computer.

* * * * *